Aug. 10, 1948. A. M. A. FERTE 2,446,751
METHOD OF OPERATING DIFFUSION BATTERIES
Filed Sept. 26, 1945 2 Sheets-Sheet 1
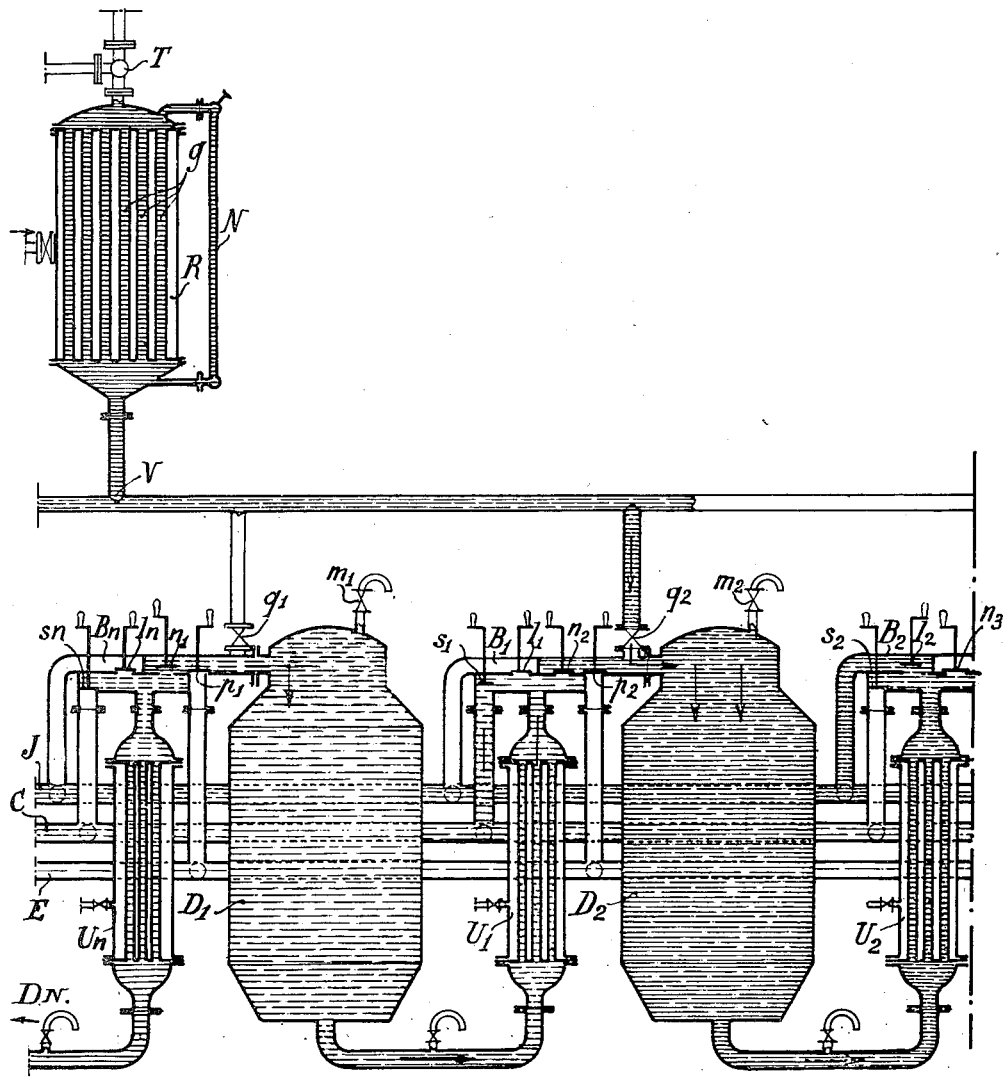
Inventor
André Marie Auguste Ferté
by Stevens and Davis
his attorneys

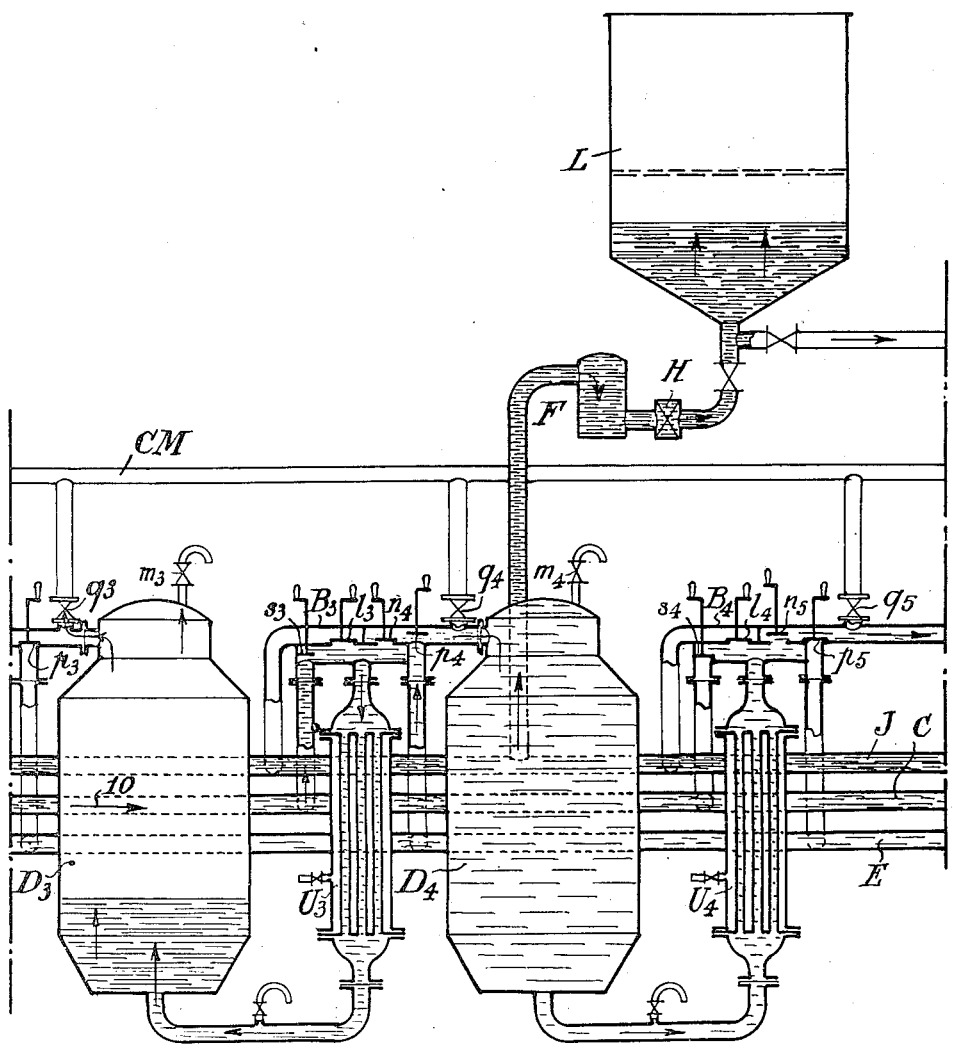

Patented Aug. 10, 1948

2,446,751

UNITED STATES PATENT OFFICE 2,446,751

METHOD OF OPERATING DIFFUSION BATTERIES

André Marie Auguste Ferté, Terny, par Margival, France

Application September 26, 1945, Serial No. 618,751
In France January 14, 1944

Section 1, Public Law 690, August 8, 1946
Patent expires January 14, 1964

5 Claims. (Cl. 127—43)

An extraction method applicable to diffusion plants particularly for extracting sugar from small pieces of beets is already known, which comprises withdrawing juice from the cell (diffusor) in the battery containing the richest or strongest juice, for instance by means of compressed gas, after said cell has been isolated from the other cells, then again mashing said cell before reinstating it into the normal diffusion cycle. It is thus possible to obtain juices denser than according to older method, the beet pieces being exhausted to a satisfactory extent in some cases. However, when operating in accordance with this method, the volume of juice thus withdrawn is strictly limited, and depends directly on the much variable weight and volume of fresh beet pieces delivered to a diffusor. Should for instance more than 92 litres of juice be desired to be withdrawn from 100 kg. of fresh beet pieces, this amounting to an exhaustion carried fairly far, one is led to introducing into the diffusor a beet piece charge lower than normal; this results in a reduction of the batch treated and an impossibility normally to take advantage of the full capacity of a diffusor.

It is an object of my invention to provide means whereby the relative volume of juice withdrawn from a diffusor in accordance with the foregoing method may be increased at will, without lessening the batch of fresh beet pieces therein.

In this connection, my invention relates to a method of operation applicable to diffusion batteries wherein the diffusor containing the richest juice to be withdrawn is isolated before transferring its content to the measuring vessel.

According to this invention, when the first mashing of a diffusor is performed, I introduce into said diffusor a volume of juice larger than the available capacity of said diffusor, I collect excess juice in an auxiliary tank, and then when withdrawing juice from said diffusor I preferably re-introduce said excess juice into the diffusor, provision being made whereby the juice travels through the beet pieces in opposite direction to its travel during the mashing.

My invention also comprises a diffusion battery for carrying out the above method. According to my invention, a diffusion battery is provided with an added auxiliary tank adapted to be connected with the various diffusors through a main and individual branches with valves or cocks adapted to be controlled selectively said auxiliary tank being supplied with the excess amount (over the available volume in a diffusor) of juice used for the first mashing, the communication between the compensating vessel and the diffusors being so arranged that during draining, juice is passed through the beet pieces in a direction opposite to the direction of its travel in the mashing step.

Furthermore it is advantageous to heat the excess of juice collected in the auxiliary tank by means of a bundle of tubes, before transferring said juice to the measuring tank, i. e. before passing it again through the beet pieces in downward direction. Being at a higher temperature, the juice is suitable for better diffusion of sugars through osmose, and thus facilitates final exhaustion of beet pieces.

Where drawing off juice is performed by means of a compressed gas (sulphur dioxide or carbon dioxide), the latter will be caused to act on the level of liquid in the auxiliary tank then in the diffusor as juice is being transferred to the measuring tank. It should be understood that the upper part of the compensating vessel is not under pressure during the first mashing.

On the other hand, with a view to avoid ingress of air into the measuring tank at the end of the drawing off or draining process, which would cause production of foam, means are interposed between the pulp removing device and the measuring tank, for closing a valve automatically as soon as air enters the pipe. Such means are useful particularly in factories where the valves in the pipes leading to the measuring tank are not opened and closed automatically.

The following description with reference to the appended drawing given solely by way of example will show how this invention may be carried out.

The drawing is a diagrammatic, sectional elevation of a part of a diffusor battery improved in accordance with this invention.

The battery includes a number of diffusing cells or diffusors $D_1$, $D_2$, $D_3$ ... $D_n$, the bottom part of which communicates with a bundle of heating tubes $U_1$, $U_2$, $U_3$ ... $U_n$ connected with a valve box $B_1$, $B_2$, $B_3$ ... $B_n$. On the drawing only the diffusors $D_1 D_2 D_3 D_4$ are shown, the diffusor $D_n$ is supposed to be situated to the left of the drawing, in connection with the heating box $U_n$.

The valves in each box, $B_1$ for instance, are adapted to control communication of diffusor $B_1$ with any one of the following parts:

Main pipe J which leads rich juice to measuring tank L, through valve $l_1$;

Auxiliary collecting pipe C, through valve $s_1$;

upper part of the next diffusor $D_2$ for normal passage in series, through valve $n_2$.

On the other hand, valve box $B_1$ has a valve $p_2$ through which diffusor $D_2$ may be placed in communication with a water pipe E. Provided on the top of each diffusor is a cock $m_1, m_2, m_3 \ldots$ for the second mashing. Finally each diffusor has a cock $q_1, q_2, q_3 \ldots q_n$ which controls connection with an added main CM the function of which is explained below; connected with the latter at V is an auxiliary tank R provided with a bundle of steam heating tubes $g$ and a level indicator N. On the top of tank R is a three-way cock T through which either compressed gas may be admitted to the tank, or the vessel may be placed in communication either with atmosphere or a tank at a lower pressure than in the gas cycle.

The rich juice main pipe J leads as usual to a pulp removing device F. According to this invention, the device F communicates with an air cock H having an automatic valve which falls on its seat as soon as air enters main pipe J and device F. Thus any introduction of foam into measuring tank L at the end of a draining process is avoided.

With a view better to identifying the various liquid courses, water or wash are represented by horizontal dot lines, weak juice by horizontal hatching, mashing juice by oblique hatching, and rich juice to be drawn off by cross hatching (horizontal and oblique).

The plant operates as follows:

Let us assume that diffuser $D_2$ has just been filled with fresh beet pieces then mashed i. e. supplied from the bottom to the top with weak juice from diffusor $D_n$ by opening valves $s_n$ and $s_2$, and cock $q_2$; via cock $q_2$ excess juice from diffusor $D_2$ can be led to auxiliary tank R through main CM. Diffusor $D_2$ must be drained at this very moment; for this purpose it should altogether be isolated from the other vessels by closing valves $n_2, p_2, s_2$ and $n_3$. The valve for rich juice $l_2$ is then opened, cock $q_2$ remaining open, and cock T is moved to the proper position for compressed gas ingress. Dense juice which has been heated along tube bundle $g$ is thus driven by pressure gas into main pipe J and thence to measuring vessel L via pulp removing device F. Thus during draining, rich juice passes downwardly through the beet pieces in diffusor $D_2$, i. e. in opposite direction with reference to its travel during the preceding mashing. When diffusor $D_2$ has been drained completely, cock T is turned to exhaust so that pressure falls both within auxiliary tank R and said diffusor, then cock $q_2$ is shut.

While diffusor $D_2$ is being drained, diffusor $D_3$ (which is now the head diffusor) is charged with fresh beet pieces, and as soon as draining is completed, diffusor $D_3$ is mashed. For this purpose, it is placed in communication with diffusor $D_1$ by opening valves $s_1$ and $s_3$ while valves $l_1, l_3, n_3, p_3$ and $n_4$ are closed. The mashing cock $q_3$ is then opened. The hydrostatic pressure or head set up on tail diffuser $D_4$ by water from a tank lying above and connected with pipe E is transmitted step by step (only valves $p_4, n_5, n_6 \ldots$ being opened) to diffusor $D_1$ from which weak juice is driven via $U_1, s_1$, main pipe C (arrow 10) $s_3$ and $U_3$, into and upward through diffusor $D_3$, then up past mashing cock $q_3$, through main pipe CM, into auxiliary tank R where it will be heated along tube bundle $g$.

In order to save time, the first mashing of a cell may be initiated before the preceding vessel has been completely drained. Supposing diffusor $D_3$ for instance should be mashed, it is only necessary to open cock $m_3$ until the diffusor is full of juice. As soon as diffusor $D_2$ has been drained, juice will be raised from diffusor $D_3$ through cock $q_3$ to auxiliary tank R, cock T being turned to exhaust (or suck-in) position. After the first mashing has been completed, diffusor $D_3$ is drained by opening outlet valve $l_3$ and turning cock T to compressed gas ingress, while all other valves relating to diffusor $D_3$ are shut, except cock $q_3$.

While diffusor $D_3$ is being drained, diffusor $D_4$ will be emptied then charged with a batch of fresh beet pieces, and diffusor $D_2$ will be mashed again with weak juice from diffusor $D_1$ admitted upwardly therethrough via $s_2$ and $U_2$, mashing cock $m_2$ being open. Diffusor $D_2$ is then reinstated into the normal circuit of diffusion in series by opening valve $n_2$ alone.

As above mentioned with reference to diffusors $D_2$ and $D_3$, the first mashing of the next diffusor $D_4$ may be initiated before diffusor $D_3$ has been completely drained, similar manipulation being effected therefor.

The foregoing operations will be repeated in the same sequence for all diffusors in the battery.

Alterations may be brought about in the embodiment above described without departing from the spirit of this invention. For instance the control of valves which must be performed according to a predetermined sequence, may be automatic in order to avoid mistakes. Again it is not indispensable to use compressed air for driving rich juice into main pipe J which may alternatively be connected with the suction pipe of a pump; still again, main pipe J may be located below the bottom of the diffusors so as to set up a head, and draining may then take place simply by gravity.

What I claim is:

1. In a method of operating a diffusion battery comprising a plurality of diffusion cells, a measuring tank, means adapted for circulating the extraction liquid in a number of said cells connected in series and for conducting the juice from the head cell to the measuring tank, piping means connected in parallel with each of the cells, valve means for controlling the communication between said piping means and each of the cells and an auxiliary tank distinct from said measuring tank and connected with said piping means, the steps which consist of mashing a cell by feeding an excess of extraction liquid to the said cell, while the said valve means of said cell only are open, in collecting the excess of liquid in said auxiliary tank and in driving back both the liquid in excess contained in said auxiliary tank and the liquid contained in the mashed cell to the said measuring tank, whereby the first named fraction of the liquid passes through said cell before reaching the measuring tank.

2. In a method of operating a diffusion battery comprising a plurality of diffusion cells, a measuring tank, means adapted for circulating the extraction liquid in a number of said cells connected in series and for conducting the juice from the head cell to the measuring tank; piping means connected in parallel with each of the cells, valve means for controlling the communication between said piping means and each of the cells and an auxiliary tank distinct from said measuring tank and connected with said piping means, the steps which consist of mashing a cell by feeding an excess of extraction liquid to the said cell, while the said valve means of said cell only are open, in collecting the excess of liquid in said auxiliary tank and in introducing a gas under pressure in the said auxiliary tank for driving back both the liquid in excess contained in said auxiliary tank and the liquid contained in the mashed cell to the said measuring tank, whereby the first named fraction of the liquid passes through said cell before reaching the measuring tank.

3. In a method of operating a diffusion battery comprising a plurality of diffusion cells, a measuring tank, means adapted for circulating the extraction liquid in a number of said cells connected in series and for conducting the juice from the head cell to the measuring tank, piping means connected in parallel with each of the cells, valve means for controlling the communication between said piping means and each of the cells and an auxiliary tank distinct from said measuring tank and connected with said piping means, the steps which consist of mashing a cell by feeding an excess of extraction liquid to the said cell, while the said valve means of said cell only are open, in collecting the excess of liquid in said auxiliary tank, in heating the said liquid in said auxiliary tank and in driving back both the liquid in excess contained in said auxiliary tank and the liquid contained in the mashed cell to the said measuring tank, whereby the first named fraction of the liquid passes through said cell before reaching the measuring tank.

4. In a method of operating a diffusion battery comprising a plurality of diffusion cells, a measuring tank, means adapted for circulating the extraction liquid in a number of said cells connected in series and for conducting the juice from the head cell to the measuring tank, piping means connected in parallel with each of the cells, valve means for controlling the communication between said piping means and each of the cells and an auxiliary tank distinct from said measuring tank and connected with said piping means, the steps which consist of mashing a cell by feeding an excess of extraction liquid to the said cell, while the said valve means of said cell only are open, in collecting the excess of liquid in said auxiliary tank, in heating the said liquid in said auxiliary tank and in introducing a gas under pressure in the said auxiliary tank for driving back both the liquid in excess contained in said auxiliary tank and the liquid contained in the mashed cell to the said measuring tank, whereby the first named fraction of the liquid passes through said cell before reaching the measuring tank.

5. In a method of operating a diffusion battery comprising a plurality of diffusion cells, a measuring tank, means adapted for circulating the extraction liquid in a number of said cells connected in series and for conducting the juice from the head cell to the measuring tank, piping means connected in parallel with the top of each of the cells, valve means for controlling the communication between said piping means and the top of each of the cells and an auxiliary tank distinct from said measuring tank and connected with said piping means, the steps which consist of mashing a cell through the bottom thereof, while the said valve means of said cell only are open and until said cell and the auxiliary tank are filled, and in driving back both the liquid in excess contained in said auxiliary tank and the liquid contained in the mashed cell to the said measuring tank, whereby the first named fraction of the liquid passes through said cell before reaching the measuring tank.

ANDRÉ MARIE AUGUSTE FERTÉ.

REFERENCES CITED

The following references are of record in the file of this patent:

UNITED STATES PATENTS

| Number | Name | Date |
|---|---|---|
| 430,976 | Swenson | June 24, 1890 |
| 525,970 | Storer | Sept. 11, 1894 |
| 746,736 | Naudet | Dec. 15, 1903 |
| 1,343,737 | Naudet | June 15, 1920 |

OTHER REFERENCES

Ware, volume 1, N. Y. and London 1905, pages 189 and 191.